(12) United States Patent
Wang

(10) Patent No.: US 12,250,665 B2
(45) Date of Patent: Mar. 11, 2025

(54) RESOURCE DETERMINATION METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 664 days.

(21) Appl. No.: 17/606,338

(22) PCT Filed: Apr. 13, 2020

(86) PCT No.: PCT/CN2020/084380
§ 371 (c)(1),
(2) Date: Oct. 25, 2021

(87) PCT Pub. No.: WO2020/216084
PCT Pub. Date: Oct. 29, 2020

(65) Prior Publication Data
US 2022/0201682 A1 Jun. 23, 2022

(30) Foreign Application Priority Data
Apr. 26, 2019 (CN) .......................... 201910346253.7

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
None
See application file for complete search history.

(56) References Cited

U.S. PATENT DOCUMENTS

2005/0282568 A1\* 12/2005 Keerthi ............ H04W 56/0075
455/502
2017/0171859 A1 6/2017 Nimbalker et al.
(Continued)

FOREIGN PATENT DOCUMENTS

CN 103916913 A 7/2014
CN 107295660 A 10/2017
(Continued)

OTHER PUBLICATIONS

CNIPA First Office Action for corresponding CN Application No. 201910346253.7; Issued on Jun. 7, 2022.
(Continued)

*Primary Examiner* — Pamit Kaur
(74) *Attorney, Agent, or Firm* — CANTOR COLBURN LLP

(57) ABSTRACT

A resource determination method and device, a storage medium and a terminal are provided, the method includes: obtaining an adjustment indication information, wherein the adjustment indication information comprises a position indication information which is adapted to indicate an original time domain starting position of a first resource to be adjusted in a resource set; and determining an updated time domain starting position of each resource to be adjusted in the resource set based on the adjustment indication information, so that the updated time domain starting position of each resource to be adjusted is aligned with a preset arrival time point of data associated with the resource to be adjusted.

19 Claims, 7 Drawing Sheets

(56) References Cited

U.S. PATENT DOCUMENTS

2018/0084546 A1* 3/2018 Guo ................. H04W 72/0446
2020/0322937 A1* 10/2020 Xu ....................... H04W 72/21

FOREIGN PATENT DOCUMENTS

EP           2124375 A1     11/2009
EP           2124375 B1 *   1/2016  ............ H04W 56/00

OTHER PUBLICATIONS

EPO Extended European Search Report for corresponding EP Application No. 20796380.2; Issued May 17, 2022.
International Search Report for International Application No. PCT/CN2020/084380; Date of Mailing: Jun. 23, 2020.
Samsung, "The clock the periodicity and burst arrival time should refer to", (Change Request TS23.501 CR 1210 Current Version 16.0.0) 3GPP TSG-SA WG2 #132, (Apr. 8-12, 2019) S2-1903641; 4 pages.

* cited by examiner

RESOURCE DETERMINATION METHOD AND DEVICE, STORAGE MEDIUM AND TERMINAL

CROSS-REFERENCE TO RELATED APPLICATIONS

This is the U.S. national stage of application No. PCT/CN2020/084380, filed on Apr. 13, 2020. Priority under 35 U.S.C. § 119(a) and 35 U.S.C. § 365(b) is claimed from Chinese Patent Application No. 201910346253.7, filed on Apr. 26, 2019, and entitled "RESOURCE DETERMINATION METHOD AND DEVICE, STORAGE MEDIUM AND TERMINAL", the entire disclosure of which is also incorporated herein by reference.

TECHNICAL FIELD

The present disclosure generally relates to communication technology field, and more particularly, to a resource determination method and device, storage medium and terminal.

BACKGROUND

According to relevant regulations of 802.1QBV of Institute of Electrical and Electronics Engineers (IEEE), a data packet of a Time-Sensitive Networking (TSN) flow has a fixed offset and period when the data packet arrives, and an amount of data arriving each time has a fixed size. Wherein, the offset takes a TSN clock as a reference. In other service, such as vehicle to X (V2X, also known as vehicle to everything), the data packets also have above characteristics.

A configured grant can be used to support a deterministic periodic service. A Random Access Network (RAN) 1 #95 meeting has agreed to support a configuration and activation of configurations of configured grant of a plurality set of resources on a given BandWith Part (BWP) in a serving cell, to support a variety of services, service types, multiple industrial, TSN streams with different characteristics, etc., which can enhance a reliability of a transmission and reduce a transmission delay.

In another aspect, a User Equipment (UE) or a core network can notify a base station of some service pattern information of an uplink TSN flow, which facilitates the base station accurately configuring an uplink configured and a Semi-Persistent Scheduling (SPS) resources, etc. for a UE.

Existing configured grant resources (CG resources) and SPS resources are all periodic, and a resource period value must be selected from a limited set specified in a protocol. While a period of a periodic TSN service can be an arbitrary rational number.

In practical applications, it is very likely that a period of a TSN service is not aligned with a period of a resource configured by a base station for a UE, and thus may result in a series of problems such as an extension of a transmission time of a TSN service and data of a TSN service being transmitted in segments, which is obviously impossible to meet a data transmission requirement of those TSN services that are sensitive to a time delay.

SUMMARY

Embodiments in the present disclosure provide a solution on how to better match a sending/receiving time point of a periodic service with a time domain position where the periodic resource appears, so as to reduce a transmission time delay of data, improve are liability of transmission, and improve an efficiency of utilization of resources.

In an embodiment of the present disclosure, a method for determining a resource is provided, the method includes: obtaining an adjustment indication information, wherein the adjustment indication information comprises a position indication information which is adapted to indicate an original time domain starting position of a first resource to be adjusted in a resource set; and determining an updated time domain starting position of each resource to be adjusted in the resource set based on the adjustment indication information, so that the updated time domain starting position of each resource to be adjusted is aligned with a preset arrival time point of data associated with the resource to be adjusted.

In an embodiment of the present disclosure, a device for determining a position of a resource is provided, the device includes: an obtaining circuitry, adapted to obtain an adjustment indication information, wherein the adjustment indication information comprises a position indication information which is adapted to indicate an original time domain starting position of a first resource to be adjusted in a resource set; and a determining circuitry, adapted to determine an updated time domain starting position of each resource to be adjusted in the resource set based on the adjustment indication information, so that the updated time domain starting position of each resource to be adjusted is aligned with a preset arrival time point of data associated with the resource to be adjusted.

In an embodiment of the present disclosure, a non-transitory storage medium storing one or more programs, the one or more programs comprising computer instructions, which, when executed by a processor, cause the processor to: obtaining an adjustment indication information, wherein the adjustment indication information comprises a position indication information which is adapted to indicate an original time domain starting position of a first resource to be adjusted in a resource set; and determining an updated time domain starting position of each resource to be adjusted in the resource set based on the adjustment indication information, so that the updated time domain starting position of each resource to be adjusted is aligned with a preset arrival time point of data associated with the resource to be adjusted.

DETAILED DESCRIPTION

As described in the background technology, according to a provision of an existing protocol, whether it is for an uplink configured grant Type 1 or a configured grant Type 2, or for a Downlink (DL) SPS, a base station configures one or more sets of periodic resources with a fixed period and offset for a User Equipment (UE). Wherein, the offset is calculated from a starting time point of the resource.

Specifically, a period value of a resource configured by existing configured grants (including type 1 and type 2) can be 2 symbols, 7 symbols, n*14 symbols, 6 symbols, n*12 symbol, wherein n is a positive integer.

A period value of a resource configured by an existing Downlink SPS may be 10 milliseconds (ms), 20 ms, 32 ms, 40 ms, 64 ms, 80 ms, 128 ms, 160 ms, 320 ms, 640 ms, 0.5 ms or less.

However, a period of a periodic TSN service can be an arbitrary rational number.

In another aspect, a time domain starting position of a resource can only be configured at a starting time point of a subframe or a slot, and an arrival time point of data of a TSN service can also be an arbitrary rational number, such as 0.1 ms, 1.5 ms, etc.

Figure 1:
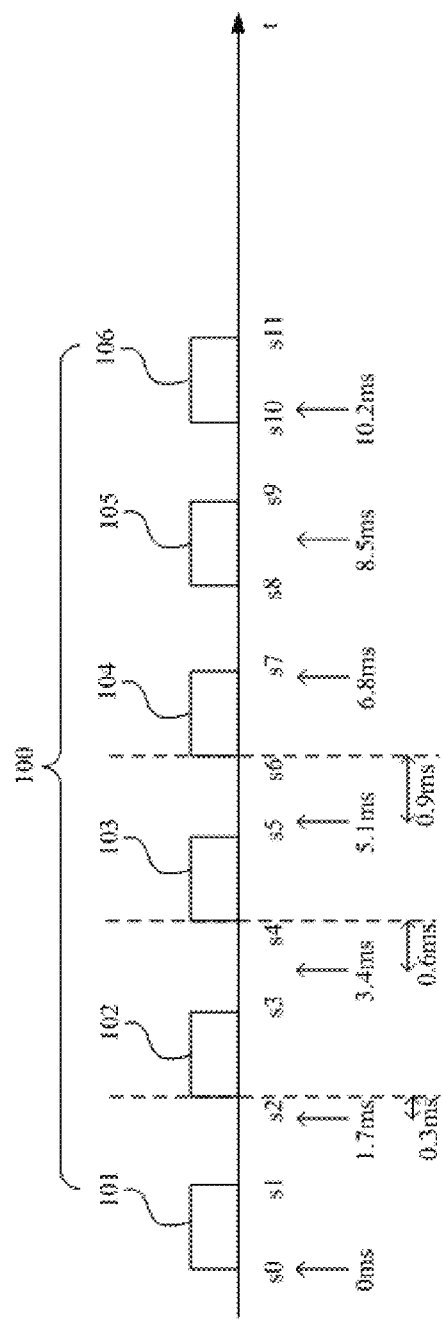
FIG. 1 schematically illustrates a distribution diagram of positions of a time domain of resources and data in a conventional technology.

For example, referring to FIG. 1, it is assumed that a resource set 100 configured by a base station for the UE includes a number of resources. FIG. 1 only shows time domain positions of first 6 resources in the resource set 100. The first 6 resources includes resource 101, resource 102, resource 103, resource 104, resource 105, and resource 106 in an order of time domain.

Assuming that a period of resources in the resource set 100 is 2 ms, and a time domain starting position of a first resource in the resource set 100 is subframe 0 (as marked with s0 in the figure), it can be inferred that a distribution of time domain positions of the resource set 100 in a time domain t is as shown in FIG. 1. That is, a time domain starting position of resource 101 is s0, a time domain starting position of resource 102 is subframe 2 (as marked with s2 in the figure), a time domain starting position of resource 103 is subframe 4 (as marked with s4 in the figure), a time domain starting position of resource 104 is subframe 6 (as marked with s6 in the figure), a time domain starting position of resource 105 is subframe 8 (as marked with s8 in the figure), and a starting position of a time domain of resource 106 is subframe 10 (as marked with s10 in the figure).

An upward arrow shown in the figure indicates an arrival time point of data. Assuming that an arrival time point of a first data of a current service is 0 ms and a period of the data is 1.7 ms, it can be inferred that an arrival time point of a periodic data of the current service is as shown in FIG. 1. That is, an arrival time point of the first data is 0 ms, an arrival time point of a second data is 1.7 ms, an arrival time point of a third data is 3.4 ms, an arrival time point of a fourth data is 5.1 ms, an arrival time point of a fifth data is 6.8 ms, an arrival time point of a sixth data is 8.5 ms, and an arrival time point of a seventh data is 10.2 ms.

Assuming that a maximum tolerable time delay of the current service is 0.8 ms, referring to FIG. 1, it can be seen that the arrival time point of the first data and the time domain starting position of the resource 101 are in a same position. Therefore, the first data can be carried and transmitted by the resource 101; the arrival time point of the second data is earlier than the time domain starting position of the resource 102, and a time domain deviation between the arrival time point of the second data and the time domain starting position of the resource 102 is 0.3 ms, which is still within the maximum tolerable time delay range of 0.8 ms. Thus, the second data can be carried and transmitted by the resource 102. The arrival time point of the third data is earlier than the time domain starting position of the resource 103, and a time domain deviation between the arrival time point of the third data and the time domain starting position of the resource 103 is 0.6 ms, which is still within the maximum tolerable time delay range of 0.8 ms. Thus, the third data can be carried and transmitted by resource 103.

However, the arrival time point of the fourth data is earlier than the time domain starting position of resource 104, and a time domain deviation between the arrival time point of the fourth data and the time domain starting position of resource 104 is 0.9 ms, which exceeds the maximum tolerable time delay range of 0.8 ms. Thus, from the fourth data, all subsequent data will not be carried and transmitted by remaining resources starting from the resource 104 in the resource set 100.

It can be seen from FIG. 1 that a time domain starting position of a periodic resource can only be located at a start point of a slot or a subframe, and the period can only be selected from limited candidate values specified in a protocol. While, an arrival time point of data and a period value of data can be an arbitrary rational number. Thus, it is difficult for an arrival time point of a periodic service to send/receive data to perfectly match with a time domain starting position of a periodic resource, which leads to a series of problems such as a large time delay in a service transmission and data being transmitted in segments. This is intolerable for those TSN services that are sensitive to time delay.

According to embodiments of the present disclosure, a method for determining a resource is provided, the method includes: obtaining an adjustment indication information, wherein the adjustment indication information comprises a position indication information adapted to indicate an original time domain starting position of a first resource to be adjusted in a resource set; and determining an updated time domain starting position of each resource to be adjusted in the resource set based on the adjustment indication information, so that the updated time domain starting position of each resource to be adjusted is aligned with a preset arrival time point of data associated with the resource to be adjusted.

According to embodiments of the present disclosure, a sending/receiving time point of a periodic service can be better matched with a time domain position where the periodic resource is located, thereby effectively reducing a transmission time delay of data, improving a reliability of transmission, and improving an efficiency of resource utilization. Specifically, in a source set, a first resource among one or more resources needed to be adjusted is determined based on an adjustment indication information, and a remaining resource in the resource set starting from the first resource are all translated to a corresponding position, so that a time domain starting position of each resource in the resource set is aligned with a preset arrival time point of data associated with the resource, so that data that arrives periodically can be transmitted in time.

In order to clarify the object, characteristic and advantages of embodiments of the present disclosure, the embodiments of present disclosure will be described clearly in detail in conjunction with accompanying drawings.

Figure 2:
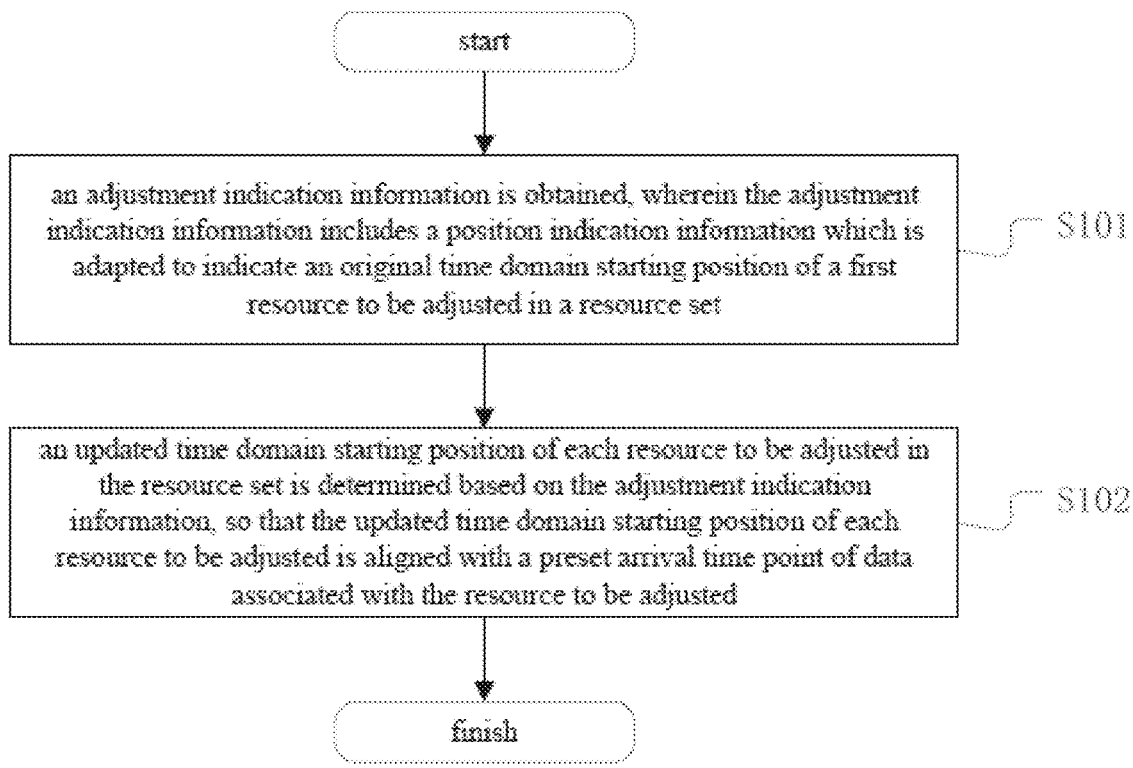
FIG. 2 schematically illustrates a flowchart of a method for determining a resource in an embodiment of the present disclosure.

FIG. 2 schematically illustrates a flowchart of a method for determining a resource in an embodiment of the present disclosure. According to the embodiment, a resource allocated to a UE can be determined by a base station with less signaling overhead. The solution of the embodiment can be executed at a UE side. A resource determined according to the embodiment can be used to transmit data of a TSN service.

For example, in order to solve the problem shown in FIG. 1 that a time domain starting position of a resource configured by a base station for a UE is not aligned with an arrival time point of data of the UE, it is necessary to configure a number of sets of data with different periods and different time domain starting positions for the UE. It takes a lot of signaling overhead to indicate all of this configuration information to the UE.

In order to reduce a signaling overhead, according to the embodiment, only a periodic configuration information of one set of resources is allowed to indicate to a UE by a base station. Combining with an adjustment indication information, a UE according to the embodiment can adjust time domain starting positions of one or more resources in a resource set configured by a base station flexibly based on a preset arrival time point of data of its own service, so that the time domain starting position of the resource is aligned with the preset arrival time point of data, to ensure that each data can be transmitted with a lowest time delay after it arrives.

Because a preset arrival time point of data of a UE is reported to a base station in advance. Thus, a resource adjustment can be calculated in the base station side, based on the arrival time point of the data and a periodic configuration information of the resource allocated to the UE, and enough resources can be reserved in a corresponding position for the UE to perform data transmission. Therefore, although the base station only indicates a periodic configuration information of one set of resources, it can still reach a consensus with the UE, so that an adjusted resource can successfully transmit data of a UE.

Wherein, the resource may be a periodic resource, including a configured grant resource, such as a configured grant Type 1 resource, or a configured grant Type 2 resource, and also including an SPS resource.

Specifically, according to the embodiment, referring to FIG. 2, the method for determining a resource may include the following S101 and S102.

In S101, an adjustment indication information is obtained, wherein the adjustment indication information includes a position indication information which is adapted to indicate an original time domain starting position of a first resource to be adjusted in a resource set.

In S102, an updated time domain starting position of each resource to be adjusted in the resource set is determined based on the adjustment indication information, so that the updated time domain starting position of each resource to be adjusted is aligned with a preset arrival time point of data associated with the resource to be adjusted.

In some embodiment, the adjustment indication information may be sent to a UE by a base station. For example, the adjustment indication information is received at least through an RRC message and/or a DCI signaling for indicating a CG resource, or an RRC message and/or a DCI signaling for indicating SPS resources.

For example, for a configured grant Type 1, the adjustment indication information is sent by an RRC message indicating a configured grant Type 1 resource.

For another example, for a configured grant Type 2, the adjustment indication information is sent by an RRC message or a DCI signaling indicating a configured grant Type 2 resource.

For another example, for a downlink SPS, the adjustment indication information is sent by an RRC message or a DCI signaling indicating a downlink SPS resource.

In practical applications, the base station may also send the adjustment indication information through other signaling in addition to the mentioned signaling.

In some embodiment, the adjustment indication information is determined by a protocol.

For example, the adjustment indication information may be associated with a service to which data belongs, and a UE and a base station may respectively determine associated adjustment indication information based on the service which have data to be transmitted currently and to which the data belongs. Whereas, there is no need for an additional signaling interaction between the UE and the base station.

Further, a protocol can specify a trigger condition according to the embodiment. When the trigger condition is met, a UE and a base station can automatically execute according to the embodiment to determine a corresponding adjustment indication information based on a service to which data belongs.

For example, the trigger condition may be a preset time domain interval, when a maximum tolerable time delay of a service to which data belongs is greater than the preset time domain interval, the trigger condition is determined not to be met. Whereas, when the maximum tolerable time delay of the service to which the data belongs is less than the preset time domain interval, the trigger condition is determined to be met, and a UE can execute according to the embodiment to ensure that a configured resource can better match an associated data.

Further, different services can correspond to different adjustment instruction information.

Further, a same service can correspond to a plurality of adjustment indication information, and the different adjustment indication information corresponds to different application scenarios or conditions of the service.

In an embodiment, before S101, the method further includes: receiving an adjustment instruction which is adapted to trigger an acquisition operation of the adjustment indication information.

In other words, in above embodiment, the adjustment instruction may include an indication instructing whether to execute according to an embodiment, and in response to the adjustment instruction and when adjustment instruction instructs to execute according to the embodiment, a UE may perform S101 to obtain an appropriate adjustment indication information based on an association relationship between a service determined by a protocol and the adjustment indication information.

In some embodiment, the resource set may include: a same set of configured grant resource, or a same set of semi-static scheduling resource. Wherein, the same set means that periods, offsets, and resource configuration parameter are the same in the set, that is, a configuration information of a CG resource or an SPS resource indicated by an RRC message and/or a DCI signaling is the same.

In some embodiment, for each resource to be adjusted, the data associated with the resource to be adjusted may include: a first data located before an original time domain position of the resource to be adjusted and cannot be carried by an arbitrary resource before the resource to be adjusted.

For example, referring to FIG. 1, data associated with resource 101 is data with a preset arrival time point of 0 ms, data associated with resource 102 is data with a preset arrival time point of 1.7 ms, data associated with resource 103 is data with a preset arrival time point of 3.4 ms, and data associated with resource 104 is data with a preset arrival time point of 5.1 ms. Based on the conventional technology, because a time domain deviation between a time domain starting position of the resource 104 and data with the preset arrival time point of 5.1 ms is greater than a maximum tolerable time delay of a service to which data belongs. Therefore, data with the preset arrival time point of 5.1 ms cannot be transmitted by resource 104. Accordingly, data associated with resource 105 are the data with the preset arrival time point of 5.1 ms and data with a preset arrival time point of 6.8 ms. Wherein, the time domain deviation (may be referred to as a deviation) refers to a time interval.

In some embodiment, said updated time domain starting position of each resource to be adjusted being aligned with the preset arrival time point of the data associated with the resource to be adjusted includes: for each resource to be adjusted, a deviation between the updated time domain position of the resource to be adjusted and the preset arrival time point of the data associated with the resource to be adjusted being less than a first preset threshold.

Further, the updated time domain starting position of the resource to be adjusted is located after the preset arrival time point of the data associated with the resource to be adjusted, that is, for each resource to be adjusted, in the time domain, the preset arrival time point of the data associated with the resource to be adjusted is earlier than the updated time domain starting position of the resource to be adjusted, so as to ensure that each group of data associated with the resource to be adjusted can match a resource according to the embodiment, and ensure that the data can be transmitted by the associated resources.

In some embodiment, a first preset threshold may be zero, that is, an updated time domain starting position of a resource to be adjusted is strictly aligned with a preset arrival time point of data associated with the resource to be adjusted.

In some embodiment, a first preset threshold may be non-zero but less than a rational number of a maximum tolerable time delay of a service to which data belongs, such that an updated time domain starting position of a resource to be adjusted is consistent with data associated with the resource to be adjusted.

In some embodiment, a preset arrival time point of data may be a theoretical arrival time point of the data calculated based on a period and an offset of a service in a service pattern. The service pattern can be reported to a base station by a UE, or the service pattern can be notified to the UE by the base station, or the service pattern can be notified to the base station and/or the UE by a core network, or the service pattern can be obtained by the UE and/or the base station in other manners In some embodiment, taking into account an interference caused by factors such as an actual channel environment, a preset arrival time point of data may also be an arrival time point that comprehensively considers a jitter of a service arrival time based on aforementioned theoretical arrival time point.

In some embodiment, a preset arrival time point of data may also be an arrival time point determined by an arbitrary rule agreed upon between a base station and a UE.

In some embodiment, the position indication information includes a relative time domain starting position of the first resource to be adjusted, wherein the relative time domain starting position includes a deviation between the original time domain starting position of the first resource to be adjusted and a preset reference time point. Thus, an original time domain starting position of the first resource to be adjusted can be intuitively determined through the relative time domain starting position, and positions of resources can be adjusted from the first resource to be adjusted, so that a time domain starting position of each resource in a resource set is aligned with a preset arrival time point of data associated with the resource.

Figure 3:
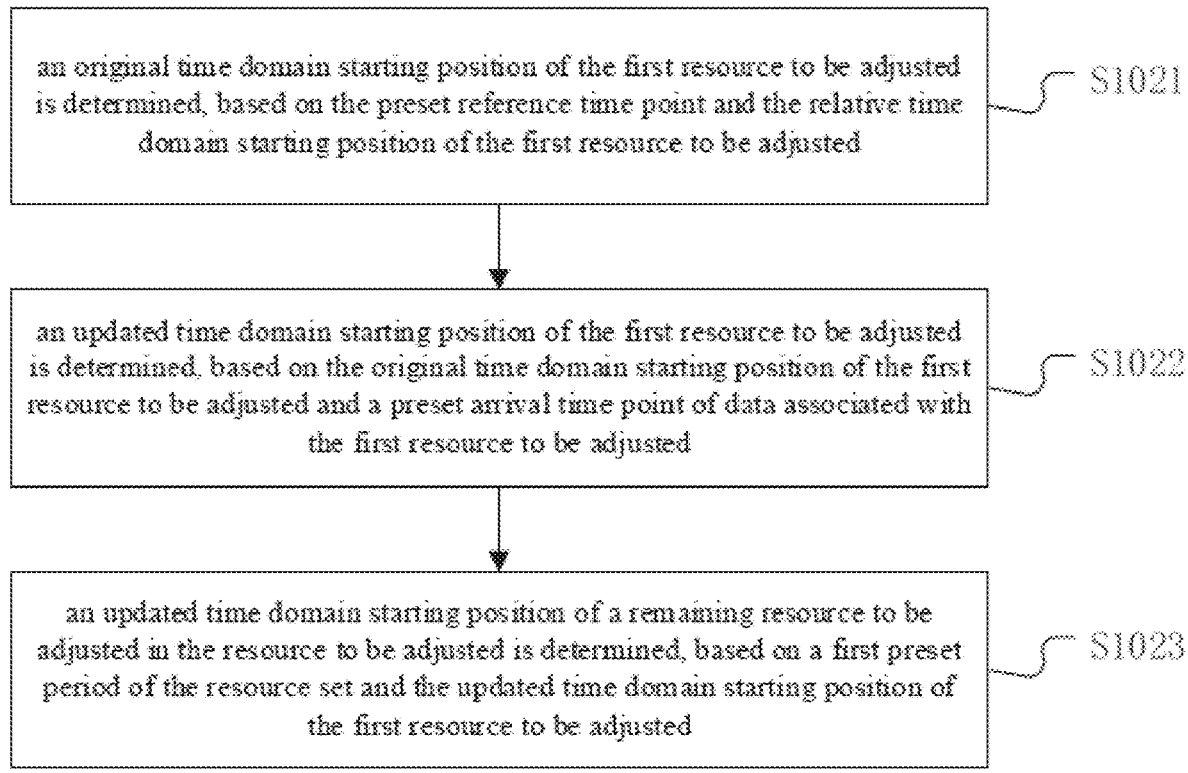
FIG. 3 schematically illustrates a flowchart of an embodiment of S102 shown in FIG. 2.

In some embodiment, referring to FIG. 3, the S102 may include S1021, S1022 and S1023.

In S1021, an original time domain starting position of the first resource to be adjusted is determined, based on the preset reference time point and the relative time domain starting position of the first resource to be adjusted.

In S1022, an updated time domain starting position of the first resource to be adjusted is determined, based on the original time domain starting position of the first resource to be adjusted and a preset arrival time point of data associated with the first resource to be adjusted.

In S1023, an updated time domain starting position of a remaining resource to be adjusted in the resource to be adjusted is determined, based on a first preset period of the resource set and the updated time domain starting position of the first resource to be adjusted.

Specifically, in a first adjustment, the preset reference time point is determined based on an original time domain starting position of a first block resource in the resource set.

Further, from a second adjustment, the preset reference time point is determined based on an updated time domain starting position of a first resource to be adjusted during a previous adjustment.

Further, the first preset period may be a period of the resource set configured by a base station.

Figure 4:
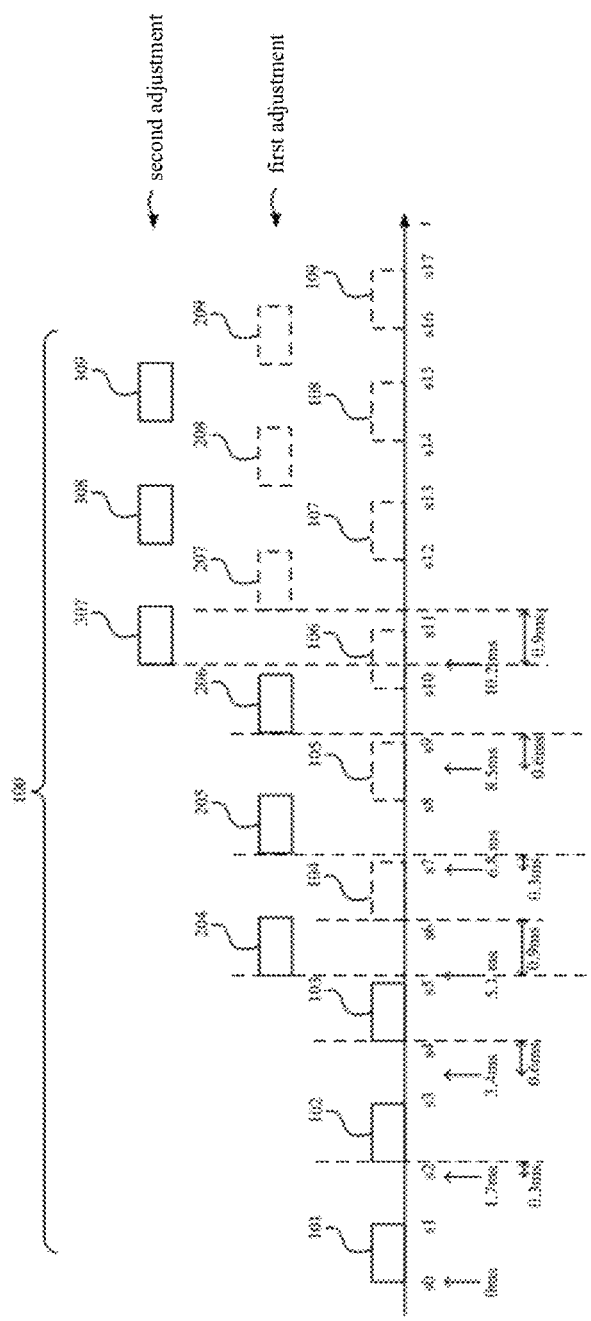
FIG. 4 schematically illustrates a distribution diagram of time domain positions of resources and data determined according to the embodiment shown in FIG. 2.

For example, referring to FIG. 4, referring to an aforementioned corresponding description of FIG. 1, starting from a fourth data, all subsequent data cannot be carried and transmitted respectively through remaining resources in the resource set 100 from resource 104.

In this example, the relative time domain starting position of the first resource to be adjusted may be 6 subframes, that is, 12 number of slots, or 6 ms.

Correspondingly, in the first adjustment, starting from the original time domainpositions0 of resource 101, resource 104 which is 6 subframes apart from the original time domain position is the first resource to be adjusted in the first adjustment, and the original time domain starting position of resource 104 is subframe 6 (*s*6).

Further, based on the original time domain starting position s6 of resource 104 and the preset arrival time point of 5.1 ms of the fourth data associated with resource 104, it can be determined that resource 104 needs to be moved forward to 5.1 ms in the time domain, so that the updated time domain starting position of resource 104 is aligned with a starting arrival time point of the fourth data. For simplifying description, resource 104 that has gone through the first adjustment is referred to as resource 204 thereinafter.

Further, after determining that the updated time domain starting position of resource 204 is 5.1 ms, updated time domain starting positions of resource 105 and its subsequent resources can be determined based on a period of two subframes of resource set 100.

For example, the updated time domain starting position of the of the resource 105 is 5.1 ms+2 number of subframes, that is, 7.1 ms.

For brief of description, resource 105 shown in the figure that has gone through the first adjustment is referred to as resource 205 thereinafter, resource 106 that has gone through the first adjustment is referred to as resource 206, resource 107 that has gone through the first adjustment is referred to as resource 207, resource 108 that has gone through the first adjustment is referred to as resource 208, and resource 109 that has gone through the first adjustment is referred to as resource 209.

After the first adjustment, time domain deviations between resource 204, resource 205, resource 206 and the preset arrival time points of the data associated with respective resources are all within a maximum tolerable time delay range of 0.8 ms. From resource 207, a next round of adjustment is started.

In the second adjustment, the preset reference time point is determined based on the updated time domain starting position of resource 204. Therefore, an original time domain starting position of a first resource to be adjusted in the second adjustment is 5.1 ms+6 number of subframes, that is, the first resource to be adjusted in the second adjustment is resource 207, and its original time domain starting position is 11.1 ms.

Similar to a process of the first adjustment, in the second adjustment, based on the original time domain starting position 11.1 ms of resource 207 and the preset arrival time point 10.2 ms of the seventh data associated with resource 207, it can be determined that resource 207 needs to be moved forward to 10.2 ms in the time domain, so that the updated time domain starting position of resource 207 is aligned with a starting arrival time point of the seventh data. For brief of description, resource 207 that has gone through the second adjustment is referred to as resource 307 thereinafter.

Further, after determining that the updated time domain starting position of resource 307 is 10.2 ms, an updated time domain starting positions of resource 208 and of its subsequent resources can be determined based on a period of two subframes of the resource set 100.

For example, the updated time domain starting position of resource 208 is 10.2 ms+2 number of subframes, that is, 12.2 ms. For brief of description, resource 208 shown in the figure that has gone through the second adjustment is referred to as resource 308 thereinafter, resource 209 that has gone through the second adjustment is referred to as resource 309.

After the second adjustment, time domain deviations between resource 307, resource 308, resource 309 and the preset arrival time points of the data associated with respective resources are all within a maximum tolerable time delay range of 0.8 ms. In this loop iteration, updated time domain starting positions of all resources included in the resource set 100 can be determined, and the updated time domain starting positions of all resources can be aligned with preset arrival time points of data associated with the resources.

Further, in the foregoing loop iteration process, during each adjustment, an original time domain starting position of a first resource to be adjusted is an updated time domain starting position of the resource to be adjusted after a previous adjustment.

Further, in the foregoing loop iteration process, each adjustment is recalculated based on an updated time domain starting position of a first resource to be adjusted in a previous adjustment to determine a first resource to be adjusted for this adjustment.

In some embodiment, the position indication information includes a relative resource sequence number of the first resource to be adjusted, wherein the relative resource sequence number includes a deviation between a resource sequence number of the first resource to be adjusted and a preset reference sequence number. Thus, an original time domain starting position of the first resource to be adjusted can be intuitively determined through the relative resource sequence number, and positions of resources can be adjusted from the first resource to be adjusted, so that a time domain starting position of each resource in a resource set is aligned with a preset arrival time point of data associated with the resource.

Figure 5:
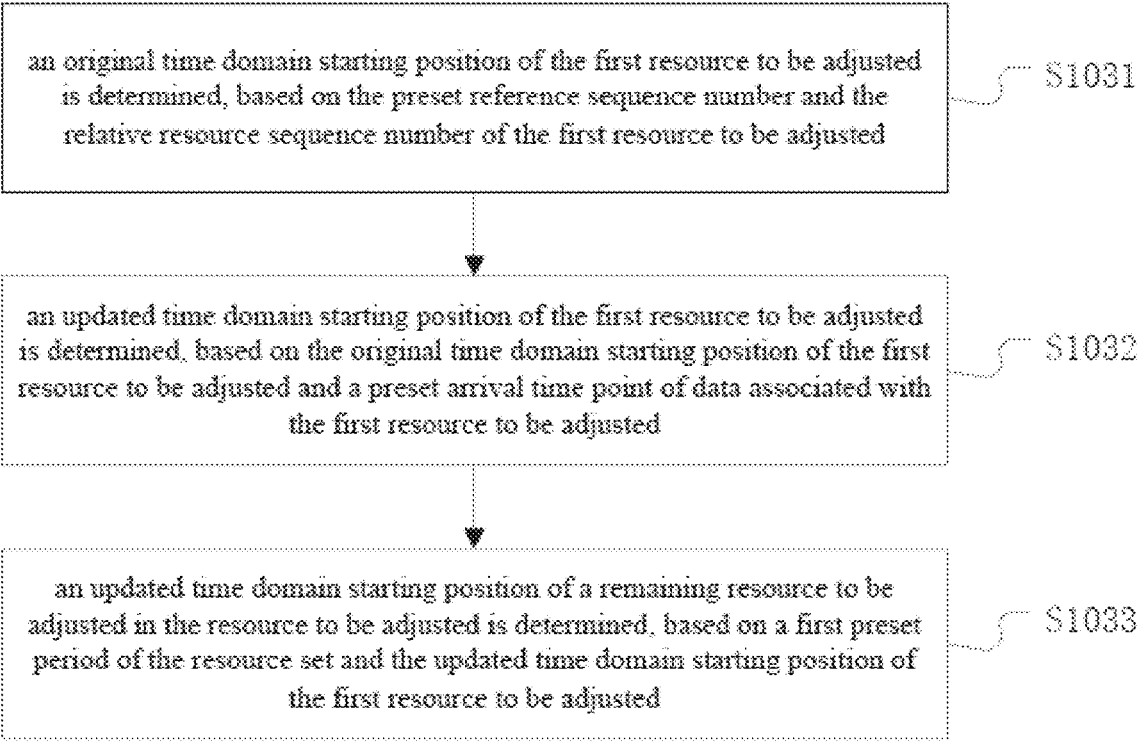
FIG. 5 schematically illustrates a flowchart of another embodiment of S102 shown in FIG. 2.

Further, referring to FIG. 5, S102 may include S1031, S1032 and S1033.

In S1031, an original time domain starting position of the first resource to be adjusted is determined, based on the preset reference sequence number and the relative resource sequence number of the first resource to be adjusted.

In S1032, an updated time domain starting position of the first resource to be adjusted is determined, based on the original time domain starting position of the first resource to be adjusted and a preset arrival time point of data associated with the first resource to be adjusted.

In S1033, an updated time domain starting position of a remaining resource to be adjusted in the resource to be adjusted is determined, based on a first preset period of the resource set and the updated time domain starting position of the first resource to be adjusted.

Specifically, in a first adjustment, the preset reference sequence number is determined based on a resource sequence number of a first block resource in the resource set.

Further, from a second adjustment, the preset reference sequence number is determined based on a resource sequence number of a first resource to be adjusted during a previous adjustment.

Further, the first preset period may be a period of the resource set configured by a base station.

For example, referring to FIG. 4, referring to an aforementioned corresponding description of FIG. 1, starting from a fourth data, all subsequent data cannot be carried and transmitted respectively through remaining resources in the resource set 100 from resource 104.

In this example, a relative resource sequence number of a first resource to be adjusted may be 3 resource sequence numbers.

Correspondingly, in the first adjustment, from a resource sequence number of the resource 101, the resource 104 whose resource sequence number is separated by 3 resource sequence numbers is the first resource to be adjusted in the first adjustment, and the original time domain starting position of the resource 104 is subframe 6 ($s6$).

Further, based on the original time domain starting position s6 of resource 104 and the preset arrival time point of 5.1 ms of the fourth data associated with resource 104, it can be determined that resource 104 needs to be moved forward to 5.1 ms in the time domain, so that the updated time domain starting position of resource 104 is aligned with a starting arrival time point of the fourth data. For simplifying description, resource 104 that after the first adjustment is referred to as resource 204 thereinafter.

Further, after determining that the updated time domain starting position of resource 204 is 5.1 ms, updated time domain starting positions of resource 105 and its subsequent resources can be determined based on a period of two subframes of resource set 100.

For example, the updated time domain starting position of the of the resource 105 is 5.1 ms+2 number of subframes, that is, 7.1 ms.

For brief of description, resource 105 shown in the figure that has gone through the first adjustment is referred to as resource 205 thereinafter, resource 106 that has gone through the first adjustment is referred to as resource 206, resource 107 that has gone through the first adjustment is referred to as resource 207, resource 108 that has gone through the first adjustment is referred to as resource 208, resource 109 that has gone through the first adjustment is referred to as resource 209.

After the first adjustment, deviations of time domains between resource 204, resource 205, resource 206 and the preset arrival time points of the data associated with respective resources are all within a maximum tolerable time delay range of 0.8 ms. From resource 207, a next round of adjustment is started.

In the second adjustment, the preset reference sequence number is determined based on the resource sequence of resource 204. Therefore, the first resource to be adjusted is 4+3, that is, resource 207 with the resource sequence 7, and its original time domain starting position is 11.1 ms.

Similar to a process of the first adjustment, in the second adjustment, based on the original time domain starting position 11.1 ms of resource 207 and the preset arrival time point 10.2 ms of the seventh data associated with resource 207, it can be determined that resource 207 needs to be moved forward to 10.2 ms in the time domain, so that the updated time domain starting position of resource 207 is aligned with a starting arrival time point of the seventh data. For brief of description, resource 207 that has gone through the second adjustment is referred to as resource 307 thereinafter.

Further, after determining that the updated time domain starting position of resource 307 is 10.2 ms, updated time domain starting positions of resource 208 and its subsequent resources can be determined based on a period of two subframes of the resource set 100.

For example, the updated time domain starting position of resource 208 is 10.2 ms+2 number of subframes, that is, 12.2 ms. For resource 208 shown in the figure that has gone through the second adjustment is referred to as resource 308 in the following, resource 209 that has gone through the second adjustment is referred to as resource 309.

After the second adjustment, time domain deviations between resource 307, resource 308, resource 309 and the preset arrival time points of the data associated with respective resources are all within a maximum tolerable time delay range of 0.8 ms. In this loop iteration, updated time domain starting positions of all resources included in the resource set 100 can be determined, and the updated time domain starting positions of all resources can be aligned with preset arrival time points of data associated with the resources.

In some embodiment, the position indication information includes a preset timer, wherein the preset timer starts timing from a preset reference time point. Thus, an original time domain starting position of the first resource to be adjusted can be accurately determined through the preset timer duration and the preset reference time point, and positions of resources can be further adjusted from the first resource to be adjusted, so that a time domain starting position of each resource in a resource set is aligned with a preset arrival time point of data associated with the resource.

Figure 6:
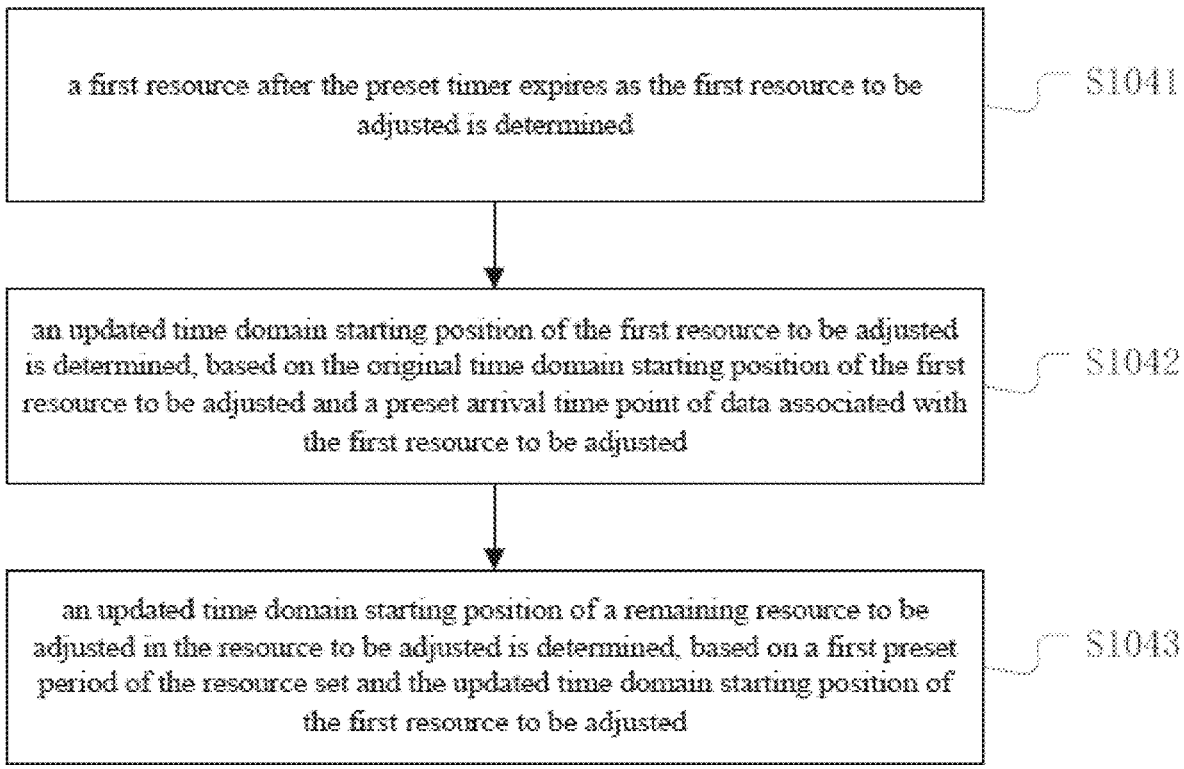
FIG. 6 schematically illustrates a flowchart of another embodiment of S102 shown in FIG. 2.

Further, referring to FIG. 6, S102 may include S1041, S1042 and S1043.

In S1041, a first resource after the preset timer expires as the first resource to be adjusted is determined.

In S1042, an updated time domain starting position of the first resource to be adjusted is determined, based on the original time domain starting position of the first resource to be adjusted and a preset arrival time point of data associated with the first resource to be adjusted.

In S1043, an updated time domain starting position of a remaining resource to be adjusted in the resource to be adjusted is determined, based on a first preset period of the resource set and the updated time domain starting position of the first resource to be adjusted.

Specifically, in the first adjustment, the preset reference time point is determined based on an original time domain starting position of a first block resource in the resource set.

Further, from the second adjustment, the preset reference time point is determined based on an updated time domain starting position of a first resource to be adjusted during a previous adjustment.

Further, the preset timer may be determined based on a maximum tolerable time delay of a service to which the data belongs and a time interval between the original time domain starting position of the resource and the preset arrival time point of the data associated with the resource.

For example, starting from the preset reference time point, whether the time interval between the original time domain starting position of the resource and the preset arrival time point of the data associated with the resource is greater than the maximum tolerable time delay is compared, when the first time interval is compared to be greater than the maximum tolerable time delay, it is determined that the preset timer expires.

In other words, in some embodiment, a duration of the preset timer includes a period of time from the preset reference time point to the original time domain starting position of a first resource with a time interval greater than the maximum tolerable time delay.

Or, the duration of the preset timer may also be selected a value from the range (A, B], wherein, A is a period of time from the preset reference time point to the original time domain starting position of the resource before a first resource with a time interval greater than the maximum tolerable time delay, B is a period of time from the preset reference time point to the original time domain starting position of a first resource with a time interval greater than the maximum tolerable time delay.

Further, the first preset period may be a period of the resource set configured by a base station.

For example, referring to FIG. 4, referring to an aforementioned corresponding description of FIG. 1, starting from a fourth data, all subsequent data cannot be carried and transmitted respectively through remaining resources in the resource set 100 from resource 104.

In this example, the duration of the preset timer may be 6 subframes.

Correspondingly, in the first adjustment, the preset timer starts counting from the original time domain starting position s0 of resource 101, and when the preset timer expires, the next closest first resource in the time domain is resource 104, therefore, resource 104 is the first resource to be adjusted during the first adjustment, and the original time domain starting position of resource 104 is subframe 6 (s6).

Further, based on the original time domain starting position s6 of resource 104 and the preset arrival time point of 5.1 ms of the fourth data associated with resource 104, it can be determined that resource 104 needs to be moved forward to 5.1 ms in the time domain, so that the updated time domain starting position of resource 104 is aligned with a starting arrival time point of the fourth data. For simplifying description, resource 104 that after the first adjustment is referred to as resource 204 thereinafter.

Further, after determining that the updated time domain starting position of resource 204 is 5.1 ms, updated time domain starting positions of resource 105 and its subsequent resources can be determined based on a period of two subframes of resource set 100.

For example, the updated time domain starting position of the of the resource 105 is 5.1 ms+2 number of subframes, that is, 7.1 ms.

For brief of description, resource 105 shown in the figure that has gone through the first adjustment is referred to as resource 205 thereinafter, resource 106 that has gone through the first adjustment is referred to as resource 206, resource 107 that has gone through the first adjustment is referred to as resource 207, resource 108 that has gone through the first adjustment is referred to as resource 208, resource 109 that has gone through the first adjustment is referred to as resource 209.

After the first adjustment, deviations of time domains between resource 204, resource 205, resource 206 and the preset arrival time points of the data associated with respective resources are all within a maximum tolerable time delay range of 0.8 ms. From resource 207, a next round of adjustment is started.

In the second adjustment, the preset reference time point is determined based on the updated time domain starting position of resource 204. Therefore, the preset timer starts at 5.1 ms in this adjustment, and after 6 subframes expire, the next nearest resource in the time domain t is resource 207, and thus resource 207 is the first resource to be adjusted in this adjustment with its original time domain starting position 11.1 ms.

Similar to a process of the first adjustment, in the second adjustment, based on the original time domain starting position 11.1 ms of resource 207 and the preset arrival time point 10.2 ms of the seventh data associated with resource 207, it can be determined that resource 207 needs to be moved forward to 10.2 ms in the time domain, so that the updated time domain starting position of resource 207 is aligned with a starting arrival time point of the seventh data. For brief of description, resource 207 that has gone through the second adjustment is referred to as resource 307 thereinafter.

Further, after determining that the updated time domain starting position of resource 307 is 10.2 ms, updated time domain starting positions of resource 208 and of its subsequent resources can be determined based on a period of two subframes of the resource set 100.

For example, the updated time domain starting position of resource 208 is 10.2 ms+2 number of subframes, that is, 12.2 ms. For resource 208 shown in the figure that has gone through the second adjustment is referred to as resource 308 thereinafter, resource 209 that has gone through the second adjustment is referred to as resource 309.

After the second adjustment, time domain deviations between resource 307, resource 308, resource 309 and the preset arrival time points of the data associated with respective resources are all within a maximum tolerable time delay range of 0.8 ms. In this loop iteration, updated time domain starting positions of all resources included in the resource set 100 can be determined, and the updated time domain starting positions of all resources can be aligned with preset arrival time points of data associated with the resources.

The preset timer described according to the embodiment of the present disclosure can be used to indicate from which resource to start an adjustment, which can be understood as a variant of directly indicating the original time domain starting position of the first resource to be adjusted as shown in FIG. 3 and FIG. 5.

In some embodiment, the position indication information includes a preset time domain interval, wherein a length of the preset time domain interval is associated with a maximum tolerable time delay of a service to which the data belongs. Thus, an original time domain starting position of the first resource to be adjusted can be intuitively determined through the calculation of the preset time domain interval, and positions of resources can be adjusted from the first resource to be adjusted, so that a time domain starting position of each resource in a resource set is aligned with a preset arrival time point of data associated with the resource.

Figure 7:
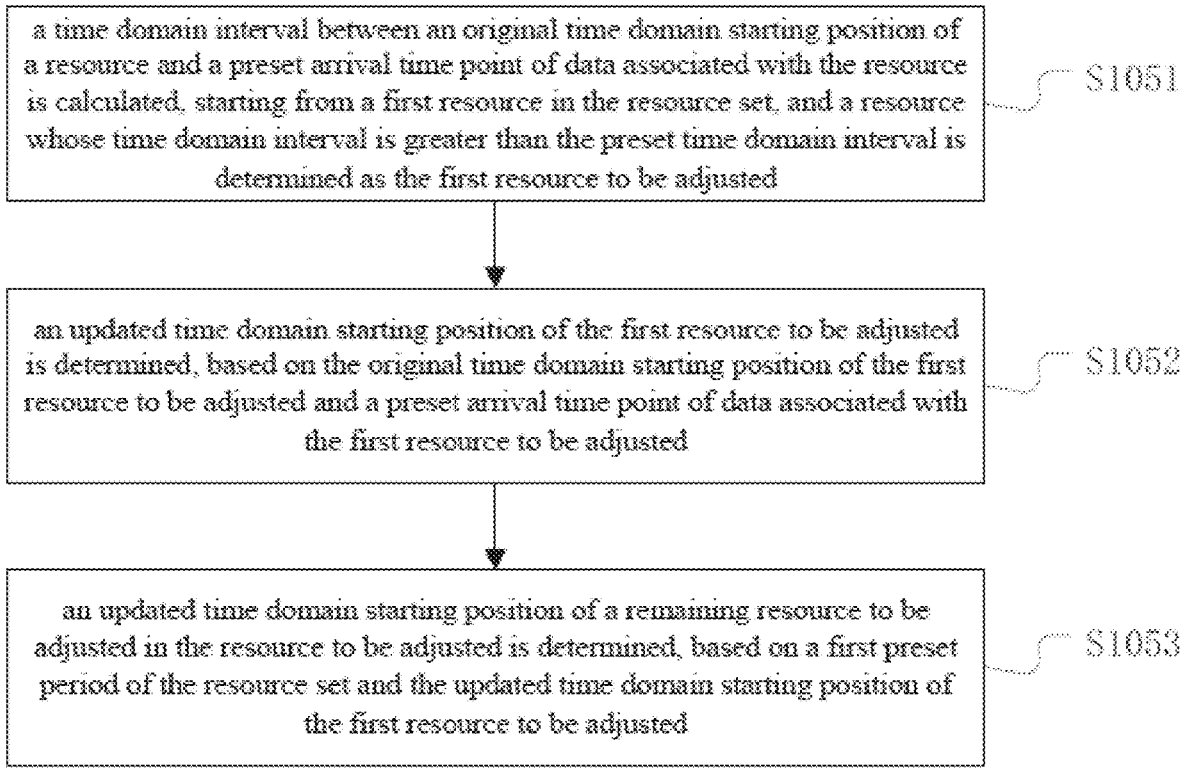
FIG. 7 schematically illustrates a flowchart of another embodiment of S102 shown in FIG. 2.

Further, referring to FIG. 7, S102 may include S1051, S1052 and S1053.

In S1051, a time domain interval between an original time domain starting position of a resource and a preset arrival time point of data associated with the resource is calculated, starting from a first resource in the resource set, and a resource with time domain interval greater than the preset time domain interval is determined as the first resource to be adjusted.

In S1052, an updated time domain starting position of the first resource to be adjusted is determined, based on the original time domain starting position of the first resource to be adjusted and a preset arrival time point of data associated with the first resource to be adjusted.

In S1053, an updated time domain starting position of a remaining resource to be adjusted in the resource to be adjusted is determined, based on a first preset period of the resource set and the updated time domain starting position of the first resource to be adjusted.

Specifically, the first resource is determined based on a first resource to be adjusted during a previous adjustment. In the first adjustment, the first resource may be a first resource in the resource set.

Further, the first preset period may be a period of the resource set configured by a base station.

Further, the preset time domain interval may be equal to a maximum tolerable time delay of a service to which the data belongs.

Or, the preset time domain interval may be less than a maximum tolerable time delay of a service to which the data belongs, so as to further shorten a data transmission time delay.

According to the embodiment of the present disclosure, from the second adjustment, the original time domain starting position of the resource may refer to an updated time domain starting position of the resource.

For example, referring to FIG. 4 and corresponding description of FIG. 1, starting from a fourth data, all subsequent data cannot be carried and transmitted respectively through remaining resources in the resource set 100 from resource 104.

In the embodiment of the present disclosure, the preset time domain interval may be 0.8 ms.

Correspondingly, in the first adjustment, from resource 101, a time domain interval between an original time domain starting position of a resource and a preset arrival time point of the data associated with the resource is calculated. When it is the turn of the resource 104, the time interval between the original time domain starting position s6 of resource 104 and the preset arrival time point of 5.1 ms of the data associated with the resource is 0.9 ms. Therefore, it can be determined that resource 104 is the first resource to be adjusted in the first adjustment, and the original time domain starting position of resource 104 is subframe 6 (s6).

Further, based on the original time domain starting position s6 of resource 104 and the preset arrival time point of 5.1 ms of the fourth data associated with resource 104, it can be determined that resource 104 needs to be moved forward to 5.1 ms in the time domain, so that the updated time domain starting position of resource 104 is aligned with a starting arrival time point of the fourth data. For simplifying description, and resource 104 that after the first adjustment is referred to as resource 204 thereinafter.

Further, after determining that the updated time domain starting position of resource 204 is 5.1 ms, updated time domain starting positions of resource 105 and its subsequent resources can be determined based on a period of two subframes of resource set 100.

For example, the updated time domain starting position of the of the resource 105 is 5.1 ms+2 number of subframes, that is, 7.1 ms.

For brief of description, resource 105 shown in the figure that has gone through the first adjustment is referred to as resource 205 thereinafter, resource 106 that has gone through the first adjustment is referred to as resource 206, resource 107 that has gone through the first adjustment is referred to as resource 207, resource 108 that has gone through the first adjustment is referred to as resource 208, and resource 109 that has gone through the first adjustment is referred to as resource 209.

After the first adjustment, deviations of time domains between resource 204, resource 205, resource 206 and the preset arrival time points of the data associated with respective resources are all within a maximum tolerable time delay range of 0.8 ms. From resource 207, a next round of adjustment is started.

In the second adjustment, the time interval between an original time domain starting position of a resource and a preset arrival time point of the data associated with the resource is calculated, starting from the resource 204 in the resource set. When it is the turn of the resource 207, the time interval between the original time domain starting position 11.2 ms of resource 207 and the preset arrival time point 10.2 ms of the data associated with the resource is 0.9 ms. Therefore, it can be determined that resource 104 is the second resource to be adjusted in the second adjustment, and the original time domain starting position of resource 207 is 11.1 ms.

Similar to a process during the first adjustment, in the second adjustment, based on the original time domain starting position 11.1 ms of resource 207 and the preset arrival time point 10.2 ms of the seventh data associated with resource 207, it can be determined that resource 207 needs to be moved forward to 10.2 ms in the time domain, so that the updated time domain starting position of resource 207 is aligned with a starting arrival time point of the seventh data. For brief of description, resource 207 that has gone through the second adjustment is referred to as resource 307 thereinafter.

Further, after determining that the updated time domain starting position of resource 307 is 10.2 ms, updated time domain starting positions of resource 208 and of its subsequent resources can be determined based on a period of two subframes of the resource set 100.

For example, the updated time domain starting position of resource 208 is 10.2 ms+2 number of subframes, that is, 12.2 ms. For resource 208 shown in the figure that has gone through the second adjustment is referred to as resource 308 thereinafter, resource 209 that has gone through the second adjustment is referred to as resource 309.

After the second adjustment, time domain deviations between resource 307, resource 308, resource 309 and the preset arrival time points of the data associated with respective resources are all within a maximum tolerable time delay range of 0.8 ms. In this loop iteration, updated time domain starting positions of all resources included in the resource set 100 can be determined, and the updated time domain starting positions of all resources can be aligned with preset arrival time points of data associated with the resources.

According to a common variant of the embodiment, the adjustment indication information may include a preset offset. Wherein, the preset offset is determined based on the original time domain starting position of the first resource in the resource set and a first preset period, and the preset arrival time of data and a second preset period.

Specifically, preset offsets and first resources to be adjusted may both be multiple, and the preset offsets may correspond to the first resources to be adjusted one by one.

For example, referring to FIG. 4, the adjustment indication information may include the original time domain starting position of resource 104 or a resource sequence number of resource 104 and a corresponding preset offset 0.9 ms, and the original time domain starting position of resource 107 or a resource sequence number of resource 107 and a corresponding preset offset 1.8 ms. In this example, the indicated original time domain starting position and a resource sequence number may both be absolute values.

Correspondingly, when a UE executes S102, based on the adjustment indication information, resources from resource 104 to resource 106 are moved forward by 0.9 ms to obtain resource 204, resource 205, and resource 206 respectively.

At the same time or later, a UE may also move forward resources from resource 107 to resource 109 by 1.8 ms based on the adjustment indication information, so as to obtain resource 307, resource 308, and resource 309.

According to the embodiment of the present disclosure, a sending/receiving time point of a periodic service can be better matched with a time domain position where the periodic resource appears, thereby effectively reducing a transmission time delay of data, improving a reliability of transmission, and improving a utilization efficiency of resources. Specifically, in a resource set, a first resource among one or more resources needed to be adjusted is determined based on an adjustment indication information, and a remaining resource in the resource set starting from the first resource are all translated to a corresponding position, so that a time domain starting position of each resource in the resource set is aligned with a preset arrival time point of data associated with the resource, so that data that arrives periodically can be transmitted in time.

In a variant of the embodiment, data and a resource in a resource set configured by a base station may not have a one by one correspondence.

Figure 8:
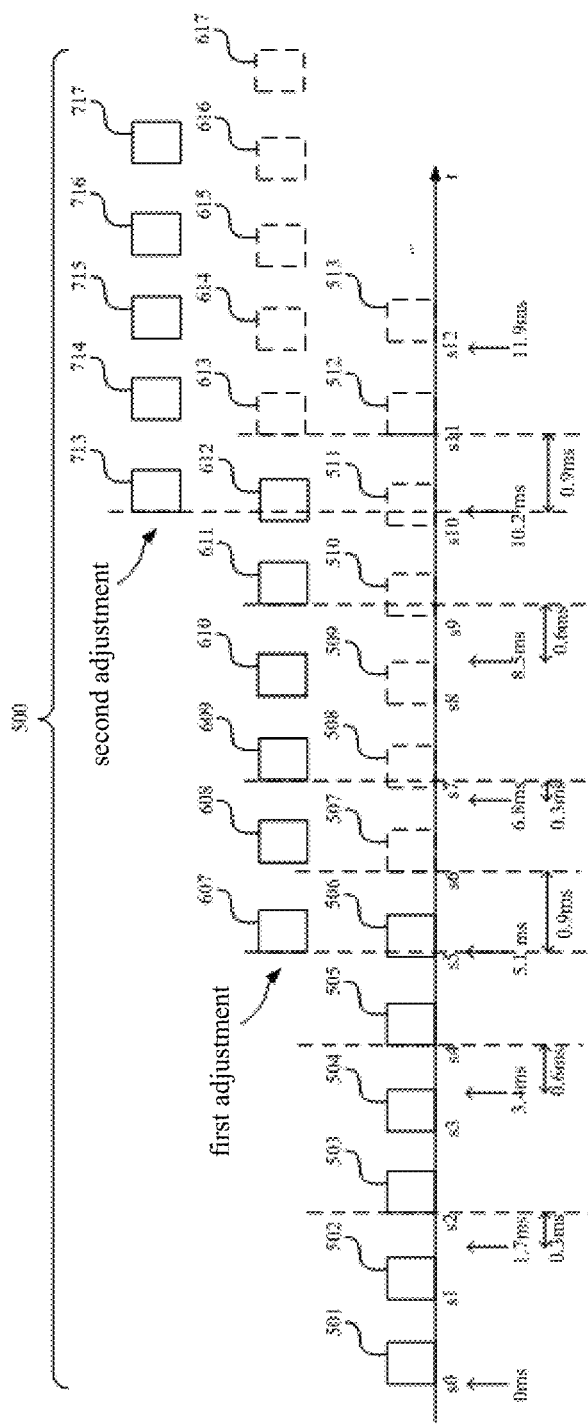
FIG. 8 schematically illustrates a schematic diagram of a typical application scenario according to an embodiment of the present disclosure.

For example, referring to FIG. 8, it is assumed that a resource set 500 configured by a base station for the UE includes a plurality of resources. FIG. 8 only shows time domain positions of first 13 resources in the resource set 500. The first 13 resources include resource 501, resource 502, resource 503, resource 504, resource 505, resource 506, resource 507, resource 508, resource 509, resource 510, resource 511, resource 512 and resource 513 in an order of time domain.

Assuming that a period of resources in the resource set 500 is 1 ms, and a time domain starting position of a first resource in the resource set 500 is subframe 0 (as marked with s0 in the figure), it can be inferred that a distribution of a time domain position of the resource set 500 in a time domain t is shown in FIG. 8.

That is, a time domain starting position of resource 501 is s0, a time domain starting position of resource 502 is subframe 1 (as marked with s1 in the figure), a time domain starting position of resource 503 is subframe 3 (as marked with s3 in the figure), a time domain starting position of resource 504 is subframe 4 (as marked with s4 in the figure), a time domain starting position of resource 505 is subframe 5 (as marked with s5 in the figure), a time domain starting position of resource 506 is subframe 6 (as marked with s6 in the figure), a time domain starting position of resource 507 is subframe 6 (as marked with s6 in the figure), a time domain starting position of resource 508 is subframe 7 (as marked with s7 in the figure), a time domain starting position of resource 509 is subframe 8 (as marked with s8 in the figure), a time domain starting position of resource 510 is subframe 9 (as marked with s9 in the figure), a time domain starting position of resource 511 is subframe 10 (as marked with s10 in the figure), a time domain starting position of resource 512 is subframe 11 (as marked with s11 in the figure), and a time domain starting position of resource 513 is subframe 12 (as marked with s12 in the figure).

An upward arrow shown in the figure indicates an arrival time point of data. Assuming that an arrival time point of a first data of a current service is 0 ms and a period of the data is 1.7 ms, it can be inferred that an arrival time point of a periodic data of the current service is shown in FIG. 8.

That is, an arrival time point of the first data is 0 ms, an arrival time point of a second data is 1.7 ms, an arrival time point of a third data is 3.4 ms, an arrival time point of a fourth data is 5.1 ms, an arrival time point of a fifth data is 6.8 ms, an arrival time point of a sixth data is 8.5 ms, an arrival time point of a seventh data is 10.2 ms, and an arrival time point of an eighth data is 11.9 ms.

Assuming that a maximum tolerable time delay of the current service is 0.8 ms, referring to FIG. 8, it can be seen that the arrival time point of the first data and the time domain staring position of the resource 101 are in a same position. Therefore, the first data can be carried and transmitted by the resource 101; the arrival time point of the second data is earlier than the time domain starting position of the resource 503, and a time domain deviation between the arrival time point of the second data and the time domain starting position of the resource 503 is 0.3 ms, which is still within the maximum tolerable time delay range of 0.8 ms. Thus, the second data can be carried and transmitted by the resource 503. The arrival time point of the third data is earlier than the time domain starting position of the resource 505, and a time domain deviation between the arrival time point of the third data and the time domain starting position of the resource 505 is 0.6 ms, which is still within the maximum tolerable time delay range of 0.8 ms. Thus, the third data can be carried and transmitted by the resource 505.

However, the arrival time point of the fourth data is earlier than the time domain starting position of the resource 506, and a time domain deviation between the arrival time point of the fourth data and the time domain starting position of the resource 506 is 0.9 ms, which exceeds the maximum tolerable time delay range of 0.8 ms. Thus, from the fourth data, all subsequent data will not be carried and transmitted by remaining resources starting from the resource 506 in the resource set 500.

Further, referring to FIG. 8, it can be seen that the second data is later than resource 502, the second data cannot be transmitted through resource 502, which makes resource 502 wasted. Similarly, resource 504, resource 506, resource 508, resource 510, and resource 512 have no data associated with the resources.

According to the embodiment, data starting from the fourth data can still be carried and transmitted by appropriate resources in remaining resources in the resource set 500 starting from resource 506.

Specifically, in this scenario, a relative time domain starting position of a first resource to be adjusted included in the position indication information may be 6 subframes.

Correspondingly, in the first adjustment, starting from the time domain original position s0 of resource 501, resource 507 whichis 6 subframes apart from the original time domain starting position is the first resource to be adjusted in the first adjustment, and the original time domain starting position of resource 104 is subframe 6 ($s6$).

Further, based on the original time domain starting position s6 of resource 507 and the preset arrival time point of 5.1 ms of the fourth data associated with resource 507, it can be determined that resource 507 needs to be moved forward to 5.1 ms in the time domain, so that the updated time domain starting position of resource 507 is aligned with a starting arrival time point of the fourth data. For brief of description, resource 507 that has gone through the first adjustment is referred to as resource 607 thereinafter.

Further, after determining that the updated time domain starting position of resource 607 is 5.1 ms, updated time domain starting position of resource 508 and its subsequent resources can be determined based on a period of two subframes of resource set 500.

For example, the updated time domain starting position of the resource 508 is 5.1 ms+1 number of subframe, that is, 6.1 ms.

For brief of description, resource 508 shown in the figure that has gone through the first adjustment is referred to as resource 608 thereinafter, resource 507 that has gone through the first adjustment is referred to as resource 607, resource 509 that has gone through the first adjustment is referred to as resource 609, resource 511 that has gone through the first adjustment will be referred to as resource 611, resource 512 that has gone through the first adjustment is referred to as resource 612, resource 513 that has gone through the first adjustment will be referred to as resource 613, resource 514 (not shown in the figure) that has gone through the first adjustment will be referred to as resource 614, resource 515 (not shown in the figure) that has gone through the first adjustment is referred to as resource 615, resource 516 (not shown in the figure) that has finished the first adjustment is referred to as resource 616, and resource 517 (not shown in the figure) that has gone through the first adjustment is referred to as resource 617.

After the first adjustment, time domain deviations between resource 607, resource 609, resource 611 and the preset arrival time points of the data associated with respective resources are all within a maximum tolerable time delay range of 0.8 ms. From resource 613, a next round of adjustment is started.

In the second adjustment, the preset reference time point is determined based on the updated time domain starting position of resource 607. Therefore, an original time domain starting position of a first resource to be adjusted in the second adjustment is 5.1 ms+6 number of subframes, that is, the first resource to be adjusted in the second adjustment is resource 613, and its original time domain starting position is 11.1 ms.

Similar to a process of the first adjustment, in the second adjustment, based on the original time domain starting position 11.1 ms of resource 613 and the preset arrival time point 10.2 ms of the seventh data associated with resource 207, it can be determined that resource 613 needs to be moved forward to 10.2 ms in the time domain, so that the updated time domain starting position of resource 613 is aligned with a starting arrival time point of the seventh data. For brief of description, resource 613 that has gone through the second adjustment is referred to as resource 713 thereinafter.

Further, after determining that the updated time domain starting position of resource 713 is 10.2 ms, an updated time domain starting position of resource 614 and of its subsequent resources can be determined based on a period of two subframes of the resource set 500.

For example, the updated time domain starting position of resource 614 is 10.2 ms+1 subframe, that is, 11.2 ms.

For brief of description, resource 614 shown in the figure that has gone through the second adjustment is referred to as resource 714 thereinafter, resource 615 that has gone through the second adjustment is referred to as resource 715, resource 616 that has gone through the second adjustment will be referred to as resource 716, and resource 617 that has gone through the second adjustment is referred to as resource 717.

After the second adjustment, time domain deviations between resource 713, resource 714, resource 715 and the preset arrival time points of the data associated with respective resources are all within a maximum tolerable time delay range of 0.8 ms. In this loop iteration, updated time domain starting positions of all resources included in the resource set 500 can be determined, and the updated time domain starting positions of all resources can be aligned with preset arrival time points of data (if any) associated with the resources.

Figure 9:
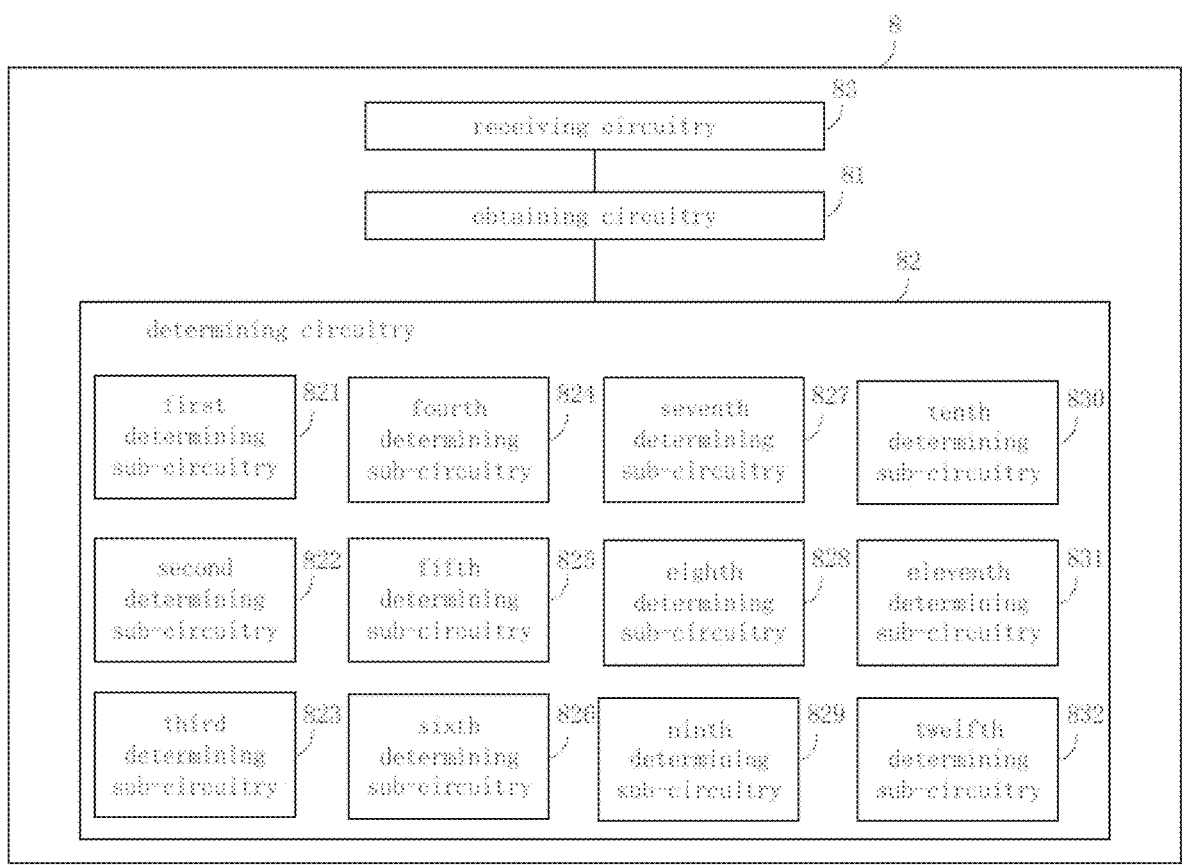
FIG. 9 schematically illustrates a schematic structural diagram of a device for determining a resource according to an embodiment of the present disclosure.

FIG. 9 is a schematic structural diagram of a device for determining a resource according to an embodiment of the present disclosure. Those skilled in the art understand that the device 8 for determining a resource (hereinafter referred to as the determining device 8) described in the embodiment can be used to implement embodiments as described in FIGS. 2 to FIG. 8.

Specifically, according to the embodiment, the determining device 8 may include: an obtaining circuitry 81, adapted to obtain an adjustment indication information, wherein the adjustment indication information comprises a position indication information which is adapted to indicate an original time domain starting position of a first resource to be adjusted in a resource set; and a determining circuitry 82, adapted to determine an updated time domain starting position of each resource to be adjusted in the resource set based on the adjustment indication information, so that the updated time domain starting position of each resource to be adjusted is aligned with a preset arrival time point of data associated with the resource to be adjusted.

Further, for each resource to be adjusted, the data associated with the resource to be adjusted includes: a first data located before an original time domain position of the resource to be adjusted and cannot be carried by an arbitrary resource before the resource to be adjusted.

Further, said updated time domain starting position of each resource to be adjusted being aligned with the preset arrival time point of the data associated with the resource to be adjusted includes: for each resource to be adjusted, a deviation between the updated time domain position of the resource to be adjusted and the preset arrival time point of the data associated with the resource to be adjusted beingless than a first preset threshold.

Further, the position indication information includes a relative time domain starting position of the first resource to be adjusted, wherein the relative time domain starting position includes a deviation between the original time domain starting position of the first resource to be adjusted and a preset reference time point.

Further, the determining circuitry 82 may include: a first determining sub-circuitry 821, adapted to determine the original time domain starting position of the first resource to be adjusted, based on the preset reference time point and the relative time domain starting position of the first resource to be adjusted; a second determining sub-circuitry 822, adapted to determine an updated time domain starting position of the first resource to be adjusted, based on the original time domain starting position of the first resource to be adjusted and a preset arrival time point of data associated with the first resource to be adjusted; and a third determining sub-circuitry 823, adapted to determine an updated time domain starting position of a remaining resource to be adjusted in the resource to be adjusted, based on a first preset period of the resource set and the updated time domain starting position of the first resource to be adjusted.

Further, the preset reference time point is determined based on an original time domain starting position of a first block resource in the resource set, or, the preset reference time point is determined based on an updated time domain starting position of a first resource to be adjusted during a previous adjustment.

In some embodiment, the position indication information includes a relative resource sequence number of the first resource to be adjusted, wherein the relative resource sequence number includes a deviation between a resource sequence number of the first resource to be adjusted and a preset reference sequence number.

Further, the determining circuitry 82 may include: a fourth determining sub-circuitry 824, adapted to determine the original time domain starting position of the first resource to be adjusted, based on the preset reference sequence number and the relative resource sequence number of the first resource to be adjusted; a fifth determining sub-circuitry 825, adapted to determine an updated time domain starting position of the first resource to be adjusted, based on the original time domain starting position of the first resource to be adjusted and a preset arrival time point of data associated with the first resource to be adjusted; and a sixth determining sub-circuitry 826, adapted to determine an updated time domain starting position of a remaining resource to be adjusted in the resource to be adjusted, based on a first preset period of the resource set and the updated time domain starting position of the first resource to be adjusted.

Further, the preset reference sequence number is determined based on a resource sequence number of a first block resource in the resource set, or, the preset reference sequence number is determined based on a resource sequence number of a first resource to be adjusted during a previous adjustment.

In some embodiment, the position indication information includes a preset timer, wherein the preset timer starts timing from a preset reference time point.

Further, the determining circuitry 82 may include: a seventh determining sub-circuitry 827, adapted to determine a first resource after the preset timer expires as the first resource to be adjusted; an eighth determining sub-circuitry

828, adapted to determine an updated time domain starting position of the first resource to be adjusted, based on the original time domain starting position of the first resource to be adjusted and a preset arrival time point of data associated with the first resource to be adjusted; and a ninth determining sub-circuitry 829, adapted to determine an updated time domain starting position of a remaining resource to be adjusted in the resource to be adjusted, based on a first preset period of the resource set and the updated time domain starting position of the first resource to be adjusted.

Further, the preset reference time point is determined based on an original time domain starting position of a first block resource in the resource set, or, the preset reference time point is determined based on an updated time domain starting position of a first resource to be adjusted during a previous adjustment.

In some embodiment, the position indication information includes a preset time domain interval, wherein a length of the preset time domain interval is associated with a maximum tolerable time delay of a service to which the data belongs.

Further, the determining circuitry 82 may include: a tenth determining sub-circuitry 830, adapted to calculate a time domain interval between an original time domain starting position of a resource and a preset arrival time point of data associated with the resource, starting from a first resource in the resource set, and determine a resource with a time domain interval greater than the preset time domain interval as the first resource to be adjusted; an eleventh determining sub-circuitry 831, adapted to determine an updated time domain starting position of the first resource to be adjusted, based on the original time domain starting position of the first resource to be adjusted and a preset arrival time point of data associated with the first resource to be adjusted; and a twelfth determining sub-circuitry 832, adapted to determine an updated time domain starting position of a remaining resource to be adjusted in the resource to be adjusted, based on a first preset period of the resource set and the updated time domain starting position of the first resource to be adjusted.

Further, the first resource is determined based on a first resource to be adjusted during a previous adjustment.

In some embodiment, before obtaining the adjustment indication information, the method further includes: receiving an adjustment instruction is adapted to trigger an acquisition operation of the adjustment indication information.

In some embodiment, the adjustment indication information is received at least through an RRC message and/or a DCI signaling for indicating a CG resource, or an RRC message and/or a DCI signaling for indicating SPS resources.

In some embodiment, the adjustment indication information is determined by a protocol.

In some embodiment, the adjustment indication information is associated with a service to which the data belongs.

In some embodiment, the resource set includes: a same set of configured grant resource, or a same set of semi-static scheduling resource.

Second determining sub-circuitry 822, fifth determining sub-circuitry 825, eighth determining sub-circuitry 828, and eleventh determining sub-circuitry 831 may constitute a same circuitry, or, may constitute a plurality of independent circuitries.

Third determining sub-circuitry 823, sixth determining sub-circuitry 826, ninth determining sub-circuitry 829, and twelfth determining sub-circuitry 832 may constitute a same circuitry, or, may constitute a plurality of independent circuitries.

Principles and detailed operation of the determining device 8 can be found in the above descriptions of the method as shown in FIG. 2 to FIG. 8, and thus are not described hereinafter.

In an embodiment of the present disclosure, a storage medium having computer instructions stored therein is provided, wherein once the computer instructions are executed, the method for determining a resource based on embodiments shown in FIG. 2 to FIG. 8 is performed. Preferably, the storage medium may include a computer-readable storage medium such as a non-volatile memory or a non-transitory memory. The storage medium may include a ROM, a RAM, a magnetic disk or an optical disk, etc.

In an embodiment of the present disclosure, a terminal including a memory and a processor is provided, wherein the memory has computer instructions stored therein, and the method based on embodiments shown in FIGS. 2 to FIG. 8 is performed is performed, once the processor executes the computer instructions. Preferably, the terminal may be a User Equipment (UE).

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for determining a resource, comprising:
obtaining an adjustment indication information, wherein the adjustment indication information comprises a position indication information which is adapted to indicate an original time domain starting position of a first resource to be adjusted in a resource set; and
determining an updated time domain starting position of each resource to be adjusted in the resource set based on the adjustment indication information, so that the updated time domain starting position of each resource to be adjusted is aligned with a preset arrival time point of data associated with the resource to be adjusted;
wherein for each resource to be adjusted, the data associated with the resource to be adjusted comprises: a first data located before an original time domain position of the resource to be adjusted and incapable of being carried by an arbitrary resource before the resource to be adjusted.

2. The method according to claim 1, wherein said updated time domain starting position of each resource to be adjusted being aligned with the preset arrival time point of the data associated with the resource to be adjusted comprises:
for each resource to be adjusted, a deviation between the updated time domain position of the resource to be adjusted and the preset arrival time point of the data associated with the resource to be adjusted being less than a first preset threshold.

3. The method according to claim 1, wherein the position indication information comprises a relative time domain starting position of the first resource to be adjusted, wherein the relative time domain starting position comprises a deviation between the original time domain starting position of the first resource to be adjusted and a preset reference time point.

4. The method according to claim 3, wherein said determining the updated time domain starting position of each resource to be adjusted in the resource set based on the adjustment indication information comprises:
   determining the original time domain starting position of the first resource to be adjusted, based on the preset reference time point and the relative time domain starting position of the first resource to be adjusted;
   determining an updated time domain starting position of the first resource to be adjusted, based on the original time domain starting position of the first resource to be adjusted and a preset arrival time point of data associated with the first resource to be adjusted; and
   determining an updated time domain starting position of a remaining resource to be adjusted in the resource to be adjusted, based on a first preset period of the resource set and the updated time domain starting position of the first resource to be adjusted.

5. The method according to claim 3, wherein the preset reference time point is determined based on an original time domain starting position of a first block resource in the resource set, or, the preset reference time point is determined based on an updated time domain starting position of a first resource to be adjusted during a previous adjustment.

6. The method according to claim 1, wherein the position indication information comprises a relative resource sequence number of the first resource to be adjusted, wherein the relative resource sequence number comprises a deviation between a resource sequence number of the first resource to be adjusted and a preset reference sequence number.

7. The method according to claim 6, wherein said determining the updated time domain starting position of each resource to be adjusted in the resource set based on the adjustment indication information comprises:
   determining the original time domain starting position of the first resource to be adjusted, based on the preset reference sequence number and the relative resource sequence number of the first resource to be adjusted;
   determining an updated time domain starting position of the first resource to be adjusted, based on the original time domain starting position of the first resource to be adjusted and a preset arrival time point of data associated with the first resource to be adjusted; and
   determining an updated time domain starting position of a remaining resource to be adjusted in the resource to be adjusted, based on a first preset period of the resource set and the updated time domain starting position of the first resource to be adjusted.

8. The method according to claim 6, wherein the preset reference sequence number is determined based on a resource sequence number of a first block resource in the resource set, or, the preset reference sequence number is determined based on a resource sequence number of a first resource to be adjusted during a previous adjustment.

9. The method according to claim 1, wherein the position indication information comprises a preset timer, wherein the preset timer starts timing from a preset reference time point.

10. The method according to claim 9, wherein said determining the updated time domain starting position of each resource to be adjusted in the resource set based on the adjustment indication information comprises:
   determining a first resource after the preset timer expires as the first resource to be adjusted;
   determining an updated time domain starting position of the first resource to be adjusted, based on the original time domain starting position of the first resource to be adjusted and a preset arrival time point of data associated with the first resource to be adjusted; and
   determining an updated time domain starting position of a remaining resource to be adjusted in the resource to be adjusted, based on a first preset period of the resource set and the updated time domain starting position of the first resource to be adjusted.

11. The method according to claim 9, wherein the preset reference time point is determined based on an original time domain starting position of a first block resource in the resource set, or, the preset reference time point is determined based on an updated time domain starting position of a first resource to be adjusted during a previous adjustment.

12. The method according to claim 1, wherein the position indication information comprises a preset time domain interval, wherein a length of the preset time domain interval is associated with a maximum tolerable time delay of a service to which the data belongs.

13. The method according to claim 12, wherein said determining the updated time domain starting position of each resource to be adjusted in the resource set based on the adjustment indication information comprises:
   calculating a time domain interval between an original time domain starting position of a resource and a preset arrival time point of data associated with the resource, starting from a first resource in the resource set;
   determining a resource with a time domain interval greater than the preset time domain interval as the first resource to be adjusted;
   determining an updated time domain starting position of the first resource to be adjusted, based on the original time domain starting position of the first resource to be adjusted and a preset arrival time point of data associated with the first resource to be adjusted; and
   determining an updated time domain starting position of a remaining resource to be adjusted in the resource to be adjusted, based on a first preset period of the resource set and the updated time domain starting position of the first resource to be adjusted.

14. The method according to claim 13, wherein the first resource is determined based on a first resource to be adjusted during a previous adjustment.

15. The method according to claim 1, wherein before obtaining the adjustment indication information, the method further comprises:
   receiving an adjustment instruction adapted to trigger an acquisition operation of the adjustment indication information.

16. The method according to claim 1, wherein the adjustment indication information is received at least through an RRC message and/or a DCI signaling for indicating a CG resource, or an RRC message and/or a DCI signaling for indicating SPS resources.

17. The method according to claim 1, wherein the adjustment indication information is determined by a protocol.

18. A device for determining a position of a resource, comprising:
   an obtaining circuitry, adapted to obtain an adjustment indication information, wherein the adjustment indication information comprises a position indication information which is adapted to indicate an original time domain starting position of a first resource to be adjusted in a resource set; and
   a determining circuitry, adapted to determine an updated time domain starting position of each resource to be adjusted in the resource set based on the adjustment indication information, so that the updated time domain starting position of each resource to be adjusted is aligned with a preset arrival time point of data associated with the resource to be adjusted;

wherein for each resource to be adjusted, the data associated with the resource to be adjusted comprises: a first data located before an original time domain position of the resource to be adjusted and incapable of being carried by an arbitrary resource before the resource to be adjusted.

19. A non-transitory storage medium storing one or more programs, the one or more programs comprising computer instructions, which, when executed by a processor, cause the processor to:

obtaining an adjustment indication information, wherein the adjustment indication information comprises a position indication information which is adapted to indicate an original time domain starting position of a first resource to be adjusted in a resource set; and determining an updated time domain starting position of each resource to be adjusted in the resource set based on the adjustment indication information, so that the updated time domain starting position of each resource to be adjusted is aligned with a preset arrival time point of data associated with the resource to be adjusted;

wherein for each resource to be adjusted, the data associated with the resource to be adjusted comprises: a first data located before an original time domain position of the resource to be adjusted and incapable of being carried by an arbitrary resource before the resource to be adjusted.

\* \* \* \* \*